US010945898B2

(12) United States Patent
Goss et al.

(10) Patent No.: US 10,945,898 B2
(45) Date of Patent: Mar. 16, 2021

(54) TWO POINT WHEELCHAIR SECUREMENT SYSTEM

(71) Applicant: VALEDA COMPANY, Oakland Park, FL (US)

(72) Inventors: John Goss, Tucson, AZ (US); Jean-Marc Girardin, Golden Beach, FL (US); Joe Esteireiro, Miramar, FL (US)

(73) Assignee: Valeda Company, Oakland Park, FL (US)

( * ) Notice: Subject to any disclaimer, the term of this patent is extended or adjusted under 35 U.S.C. 154(b) by 240 days.

(21) Appl. No.: 16/055,601

(22) Filed: Aug. 6, 2018

(65) Prior Publication Data

US 2018/0344546 A1 Dec. 6, 2018

Related U.S. Application Data

(63) Continuation of application No. 14/276,890, filed on May 13, 2014, now Pat. No. 10,071,004.

(60) Provisional application No. 61/822,521, filed on May 13, 2013.

(51) Int. Cl.
*B60P 7/08* (2006.01)
*A61G 3/08* (2006.01)

(52) U.S. Cl.
CPC .................... *A61G 3/0808* (2013.01)

(58) Field of Classification Search
CPC ....... A61G 3/0808; B60P 3/079; B60P 7/0823
USPC .................. 410/10–12, 21, 23, 100
See application file for complete search history.

(56) References Cited

U.S. PATENT DOCUMENTS

| 4,060,271 | A |   | 11/1977 | Williams |
|---|---|---|---|---|
| 4,093,303 | A |   | 6/1978 | Nelson |
| 4,257,644 | A |   | 3/1981 | Stephens |
| 4,265,478 | A |   | 5/1981 | Korsgaard |
| 4,407,616 | A | * | 10/1983 | Hinze .................. A61G 3/0808 410/3 |
| 4,427,210 | A |   | 1/1984 | Wevers |

(Continued)

FOREIGN PATENT DOCUMENTS

| EP | 1701860 B1 | 8/2007 |
|---|---|---|
| GB | 2197628 A | 5/1988 |

(Continued)

OTHER PUBLICATIONS

Braunability/Unwin EasiSit—see https://www.braunability.eu/en/products/floor-and-rails/easisit/.

*Primary Examiner* — Stephen T Gordon
(74) *Attorney, Agent, or Firm* — Daniel Tallitsch

(57) ABSTRACT

The embodiments described and claimed herein are improved wheelchair passenger securement systems and stations. In particular, one embodiment described and claimed herein is a drop-in system comprising a barrier module and a wall-side module, which incorporate two separate restraint devices which are configured to secure a wheelchair at two separate attachment points and a bumper. The system can optionally include a moveable excursion barrier or a pull-mechanism to pre-tension at least one of the restraint devices the wheelchair securements. In a simpler embodiment, a bumper and two restraint devices, such as retractors, are provided for attachment to the vehicle surfaces or structures at a wall side of a wheelchair securement area or at a rear side of the wheelchair securement area.

19 Claims, 3 Drawing Sheets

(56) References Cited

U.S. PATENT DOCUMENTS

| | | | |
|---|---|---|---|
| 4,492,403 | A | 1/1985 | Blomgren et al. |
| 4,511,171 | A | 4/1985 | Petersen |
| 4,688,843 | A | 8/1987 | Hall |
| 5,026,225 | A | 6/1991 | McIntyre |
| 6,113,325 | A | 9/2000 | Craft |
| 6,524,039 | B1 | 2/2003 | Magnuson et al. |
| 7,651,167 | B2 | 1/2010 | Sawdy |
| 7,717,655 | B2 | 5/2010 | Cardona |
| 9,610,882 | B1 * | 4/2017 | Heard .................. A61G 3/0808 |
| 10,071,004 | B2 * | 9/2018 | Goss .................... A61G 3/0808 |

FOREIGN PATENT DOCUMENTS

| | | |
|---|---|---|
| JP | 1996089532 A | 4/1996 |
| JP | 2017148445 A | 8/2017 |
| JP | 6221643 B2 | 11/2017 |

* cited by examiner

TWO POINT WHEELCHAIR SECUREMENT SYSTEM

CROSS-REFERENCE TO RELATED APPLICATIONS

This Patent Application is a Continuation of U.S. patent application Ser. No. 14/276,890 filed on May 13, 2014, which claims the benefit of U.S. Provisional Patent Application No. 61/822,251 filed on May 13, 2013, both of which are incorporated herein by reference.

STATEMENT REGARDING FEDERALLY SPONSORED RESEARCH OR DEVELOPMENT

Not Applicable.

THE NAMES OF PARTIES TO A JOINT RESEARCH AGREEMENT

Not Applicable.

INCORPORATION-BY-REFERENCE OF MATERIAL SUBMITTED ON A COMPACT DISC

Not Applicable.

BACKGROUND

Technical Field

The embodiments described and claimed herein relate generally to wheelchair securement methods, systems, and devices for wheelchair accessible vehicles. More specifically, at least some of the embodiments described herein relate to a method, system, or device for securing a wheelchair and wheelchair passenger in a vehicle (train, bus, van, plane, etc.) using 2 points of attachment for securing the wheelchair.

Background Art

The Americans with Disabilities Act (ADA) mandates that all public transit service providers must accommodate persons with disabilities, including those who must use a wheelchair as their seat in the transport vehicle. The ADA also mandates that, for the safety of the wheelchair user and near-by passengers, the wheelchair must be secured so that it will not move more than 2" in any direction during normal vehicle operation. In addition, restraints must be attached to the wheelchair—historically two in front and two in the rear—that are sufficiently strong to keep it secured in the event of a crash event.

Current systems on the market generally use a 4-point attachment system where 2 restraints are used to secure the front of the wheelchair, and 2 are used to secure the rear of the wheelchair (one on each "corner" of the wheelchair). They are considered by many to be relatively cumbersome and time-consuming to use, especially if it is a public transit vehicle where dwell times are critical.

Accordingly, there is a need for an improved securement system for securing wheelchairs in vehicles.

BRIEF SUMMARY

The embodiments described and claimed herein solve at least some of the problems of the prior art wheelchair restraint systems. In simple terms, the embodiments described and claimed herein utilize two vehicle attachment points and two wheelchair attachments points to effectively secure a wheelchair. Instead of using a third or even a fourth wheelchair attachment point like the prior art, the present system may also use a third contact or touch point between the wheelchair and bumper. The bumper can be formed in a part of the vehicle itself (such as a side-wall) or could be a separate structure that is rigidly or movably fixed to the vehicle.

In one embodiment, the concept includes a "station" or "wheelchair securement area" that represents one wheelchair position in the vehicle. The station contains a forward facing barrier with a single integrated wheelchair restraint for securing the rear of the wheelchair. The station also may contain a side module/structure where a 2nd restraint is located (i.e., on wall side of the vehicle). This side module/structure may or may not be connected to the rear forward facing barrier. Both the forward facing barrier and the side module/structure would also allow for the installation of flip seating for passengers to use when a wheelchair is not being secured.

In this concept, the front restraint is used to pull the wheelchair toward the wall (or flip seat), preventing movement of the wheelchair toward the aisle. A padding/cushion/bumper could also be used against the wall-side module to provide an opposing force that will improve the stability of the wheelchair even further. In addition, the cushion would also allow for space between the chair and the wall, preventing the wheelchair from hitting the wall/flip-seat and/or the arm or hand of the wheelchair passenger from getting caught between the two. The rear restraint is used to secure the wheelchair in such a vector/angle as to pull it in a direction both toward the opposing bumper/padding/cushion and the rear forward facing barrier/structure.

In another embodiment, the station contains a forward facing barrier with two integrated wheelchair restraints for securing the rear of the wheelchair. The station also may contain a side module/structure (i.e., on wall side of the vehicle). This side module/structure may or may not be connected to the rear forward facing barrier. Both the forward facing barrier and the side module/structure would also allow for the installation of flip seating for passengers to use when a wheelchair is not being secured.

In this concept, the two rear restraints are used to pull the wheelchair toward the forward facing barrier, and because they are connected to the wheelchair at opposing rear corners, preventing rotation of the wheelchair toward the aisle. A padding/cushion/bumper could also be used on or underneath the forward facing barrier to provide an opposing force that will improve the stability of the wheelchair even further. In addition, the cushion would also allow for space between the chair and the forward facing barrier, preventing the wheelchair from hitting the forward facing barrier and/or the arm or hand of the wheelchair passenger from getting caught between the two. In this concept, the rear bumper/padding/cushion would have to conform to the rear shape of many different types of wheelchairs as opposed to just being a static bumper.

Both of the above-described embodiments can further include a tensioning mechanism to inducing pretension into the restraints and to urge the wheelchair into contact or in close proximity to the bumper/padding/cushion.

These and additional embodiments described and claimed below provide faster securement time that the prior art for a wheelchair passenger. This is important with city buses and other public forms of transportation that are on a strict schedule. In addition, the embodiments described and claimed herein minimizes OEM installation cost and time.

Other embodiments, which include some combination of the features discussed above and below and other features which are known in the art, are contemplated as falling within the claims even if such embodiments are not specifically identified and discussed herein.

BRIEF DESCRIPTION OF THE SEVERAL VIEWS OF THE DRAWINGS

These and other features, aspects, objects, and advantages of the embodiments described and claimed herein will become better understood upon consideration of the following detailed description, appended claims, and accompanying drawings where:

Figure 1:
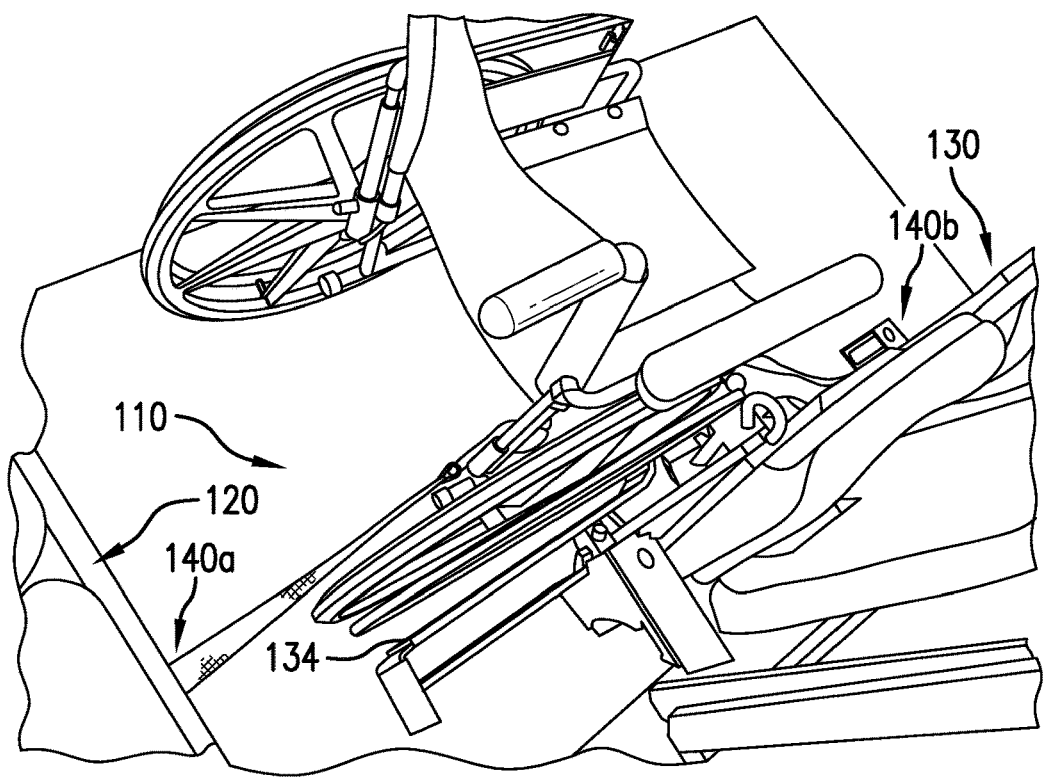
FIG. 1 is a first perspective view illustrating a first embodiment of a two-point wheelchair securement system, which includes a barrier module and a side-wall module.
Figure 2:
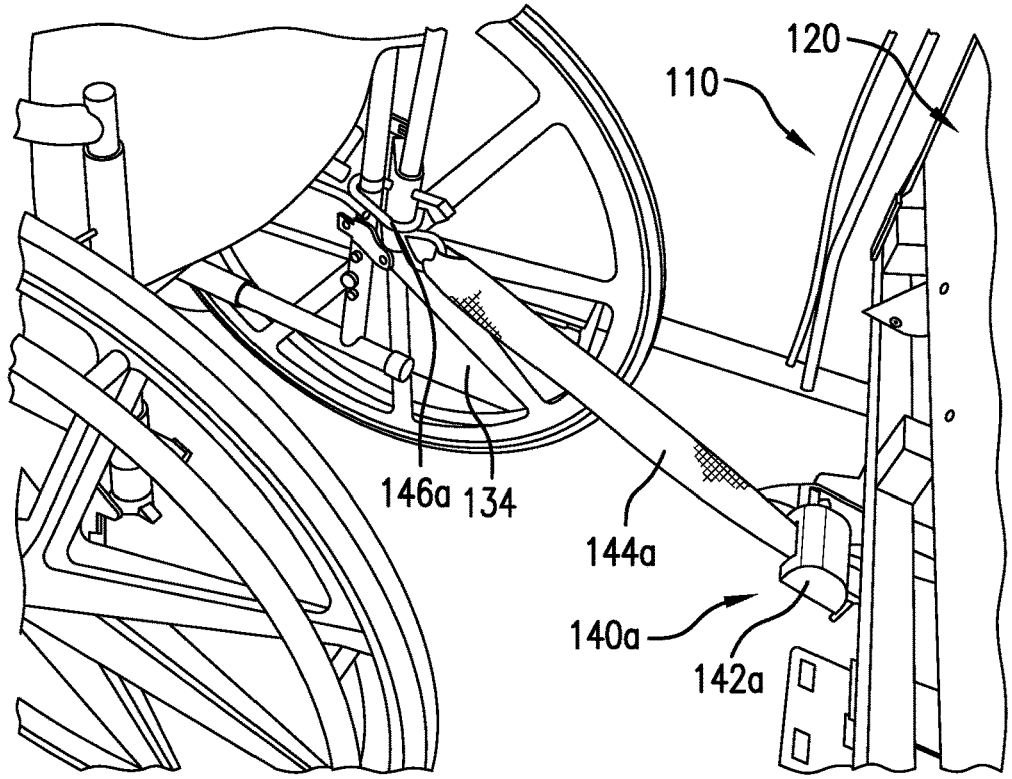
FIG. 2 is a second perspective view of the securement system of FIG. 2.
Figure 3:
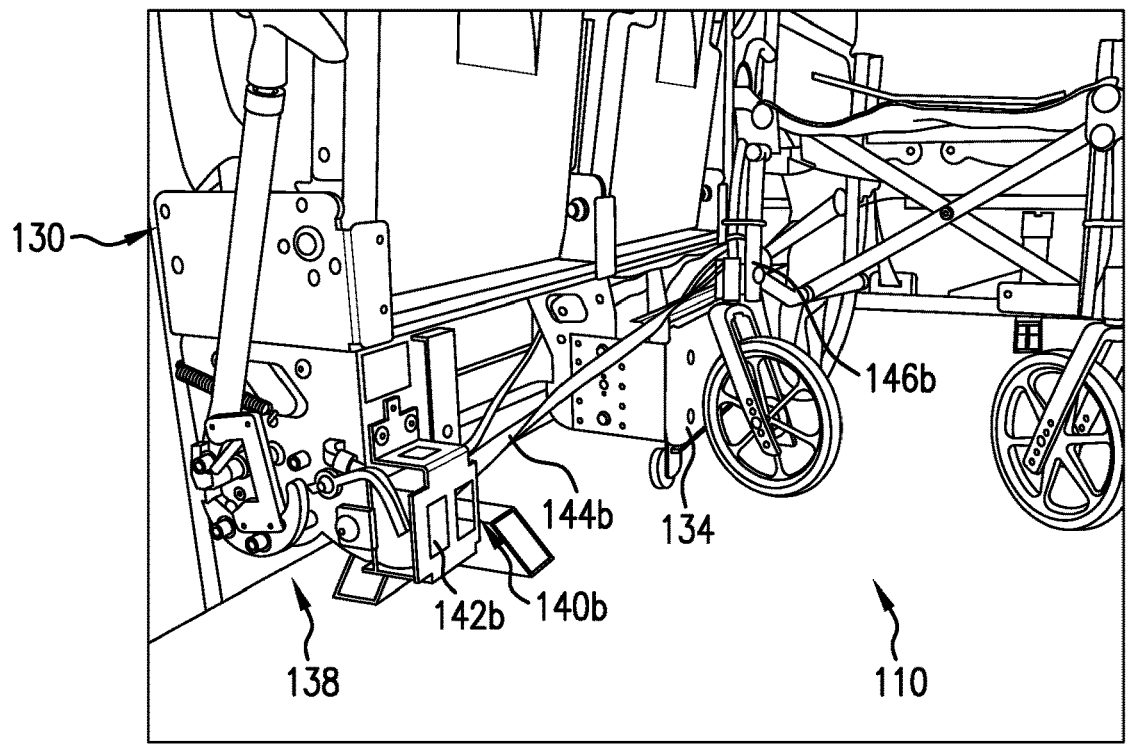
FIG. 3 is a third perspective view of the securement system of FIG. 2.
Figure 4:
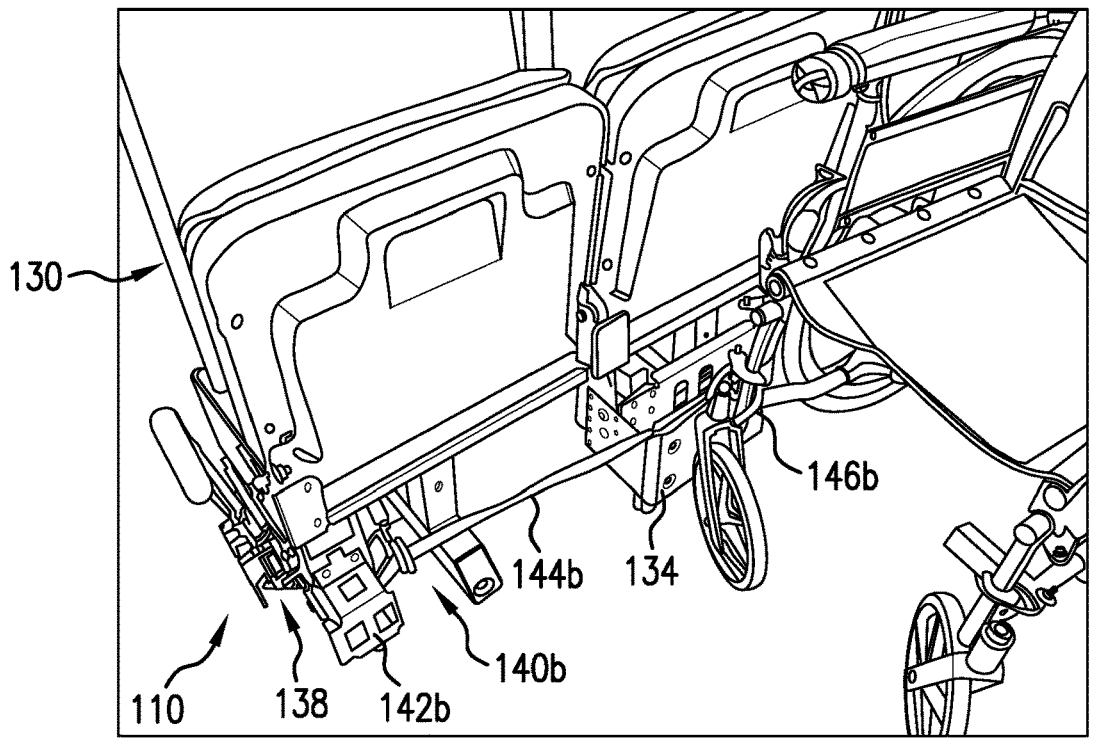
FIG. 4 is a fourth perspective view of the securement system of FIG. 2.

It should be understood that the drawings are not necessarily to scale and that the embodiments are sometimes illustrated by graphic symbols, phantom lines, diagrammatic representations and fragmentary views. In certain instances, details which are not necessary for an understanding of the embodiments described and claimed herein or which render other details difficult to perceive may have been omitted. It should be understood, of course, that the inventions described herein are not necessarily limited to the particular embodiments illustrated. Indeed, it is expected that persons of ordinary skill in the art may devise a number of alternative configurations that are similar and equivalent to the embodiments shown and described herein without departing from the spirit and scope of the claims.

Like reference numerals will be used to refer to like or similar parts from Figure to Figure in the following detailed description of the drawings.

DETAILED DESCRIPTION

Referring first to FIGS. 1-4, a first embodiment of a two-point wheelchair securement system (or station) 110 is shown for securing a wheelchair and its occupant in a vehicle, such as a bus, van, train, aircraft, boat, or the like. The first embodiment of the wheelchair securement system 110 includes a barrier module 120 and a side-wall module 130.

In the first embodiment, the wheelchair securement system 110 is best characterized as a drop-in system for a vehicle which is fully-equipped to secure a wheelchair and its passenger in a forward facing orientation (i.e., with respect to the direction of travel of the vehicle). In this orientation, the barrier module 120 is forward-facing (i.e., positioned rearward of the side-wall module 130 in the vehicle) and secures the wheelchair at a single attachment point at the rear of the wheelchair, in particular in the rear-wall-side quadrant of the wheelchair. Although shown in a configuration suitable for installation adjacent a right side wall of a vehicle, the system 110 could be configured as a mirror image of the shown configuration for installation adjacent a left side wall of the vehicle. The side-wall module 130 is positioned adjacent to a wall of the vehicle and secures the wheelchair at a single attachment point at the front of the wheelchair. The barrier module 120 and side-wall module 130, through the use of two points of attachment to the wheelchair, work in conjunction to adequately secure the wheelchair in compliance with the ADA and to prevent significant movement, twisting, or tipping of the wheelchair.

To facilitate simple installation, the shown system 110 is intended to be substantially assembled for a vehicle manufacturer (or retrofitter) and needs only to be mounted or bolted into place without any further significant installation.

To make most efficient use of vehicle space, both the barrier module 120 and the side-wall module can include flip-seats. In that respect, the area designated for the wheelchair passenger system 110 can be used for other passengers, sitting and/or standing, when it is not needed for a wheelchair passenger.

The wheelchair securement system 110 includes two securement (or tie-down) assemblies 140a, 140b which work in conjunction to adequately secure a wheelchair in compliance with the ADA. In the first embodiment, each of the two securement assemblies 140a, 140b comprise a retractor 142a, 142b. Each retractor 142a, 142b includes several feet of webbing (or strap) 144a, 144b at a terminal end of which is provided a wheelchair engaging member 146a, 146b which could be any type of fastener. The shown wheelchair engaging member or fastener is an anchor (or S-hook or J-hook) which can be easily attached to and easily removed from any portion of a wheelchair, such as a structural member. Retractors suitable for use in this application include Q'Straint's QRT Series retractors. As an alternative to the retractors shown herein, manually adjustable straps can be used, such as Q'Straint's Q-5000 and M-series belt systems.

The retractor 142a, as shown, is mounted external to the barrier module 120. However, it is contemplated that the retractor 142a can be mounted internal to the barrier module 120, as shown and described in U.S. Pat. No. 8,414,234, which is incorporated herein in its entirety by reference. If mounted internally, the only portion of the securement assembly 140a that would protrude from the barrier module 120 is the restraint strap 144a, and the wheelchair engagement members 146a.

The retractor 142b would be mounted to the leg of the side-wall module 130, underneath a fold-up seat. This configuration substantially reduces the potential tripping hazard for passengers, as compared to prior art systems which include exposed retractors.

While the depictions of the first embodiment show the retractors 142a, 142b mounted the barrier module 120 and the wall-side module 130, it is contemplated that other embodiments could mount the retractors 142a, 142b to any other component of the vehicle, such as the wall or floor. Indeed, a simple embodiment need not include the barrier module 120 or the wall-side module 130 at all. Such simple embodiments could consist of two securement assemblies which are mounted at the rear-wall corner and at the front-wall corner of the wheelchair securement area, respectively. The securement assemblies can be fastened to any surface or structure of the vehicle, including the floor and walls.

While the retractors 142a, 142b could theoretically be mounted directly to a floor surface of the vehicle, with the claims covering such a configuration, it has been found that better performance can be obtained by spacing the retractors 142a, 142b a distance from the floor, a configuration espoused by the first embodiment of the wheelchair securement system 110. However, the retractors 142a, 142b should be spaced a slight distance below the wheelchair structure to which the wheelchair engaging members 146a, 146b will be attached. In other words, it is preferable that the restraint strap 144a, 144b be slightly angled upwards toward the wheelchair so that the securement assembly 140a, 140b can exert a downward force on the wheelchair.

The barrier module 120 of the first embodiment also includes a remote control device with a release latch (or paddle handle) (not shown) for releasing one or both of the securement assemblies 140a, 140b. For example, the embodiments could include any of the systems described in U.S. provisional patent application Ser. No. 60/705,452, U.S. provisional patent application No. 60/618,572, U.S. patent application Ser. No. 11/252,326, and/or PCT patent application no. PCT/US06/30085, which are all incorporated in their entirety herein by reference.

The first embodiment of the wheelchair securement system 110 also includes a side bumper, barrier or pad 134. The side barrier 134 can be constructed of any material and can be rigid, soft and/or resilient. For example, the side barrier 134 could comprise high density polyurethane foam similar to car headrests, and could be covered with fabric. Alternatively, a metal, plastic, or rubberized structure could be used.

The side barrier 134 can serve one or more of many different functions. For example, as shown, the barrier serves at least two purposes. First, the barrier 134 provides spacing between the wheelchair and the vehicle wall (and/or the side-wall module 130). The spacing between the wheelchair and the wall/side-wall module 130 that is provided by the side barrier 134 serves to prevent injury to the wheelchair passenger in an accident, should an appendage find its way therebetween. Second, the barrier 134 resists lateral and/or rotative movement of the wheelchair towards the vehicle wall. Ideally, although not necessarily, the wheelchair will be in close proximity or will actually touch the side barrier 134 when properly secured.

In the shown embodiment, it is contemplated that the side barrier 134 would have resilient properties, wherein it would have some give, but still provide firm support for the wheelchair. In an alternative embodiment, the side barrier 134 could be biased outward using, for example, a spring that pushes the side barrier 134 outward. When the front restraint 140b was hooked up and would pull the chair in, the springs would provide an opposing force to stabilize the chair. As discussed in further detail in U.S. Pat. No. 8,414, 234, the side barrier 134 could also be mechanized or inflatable, wherein it is movable to positively contact the wheelchair and induce pre-tension into the securement assemblies 140a, 140b. In a further alternative embodiment, the side barrier 134 could be slideably mounted, as shown and described in U.S. patent application Ser. No. 13/842, 407, which is incorporated in its entirety herein by reference, to accommodate a barrier module 120 and side-wall module 130 that both include flip-seats.

In the shown embodiment, it is also contemplated that a restraint mechanism, or tensioner assembly 138, of the type disclosed in U.S. Pat. No. 8,414,234 would be used in conjunction with one or both of the restraints 140a, 140b to adequately secure the wheelchair in compliance with the ADA and to prevent significant movement, twisting, or tipping of the wheelchair.

Figure 5:
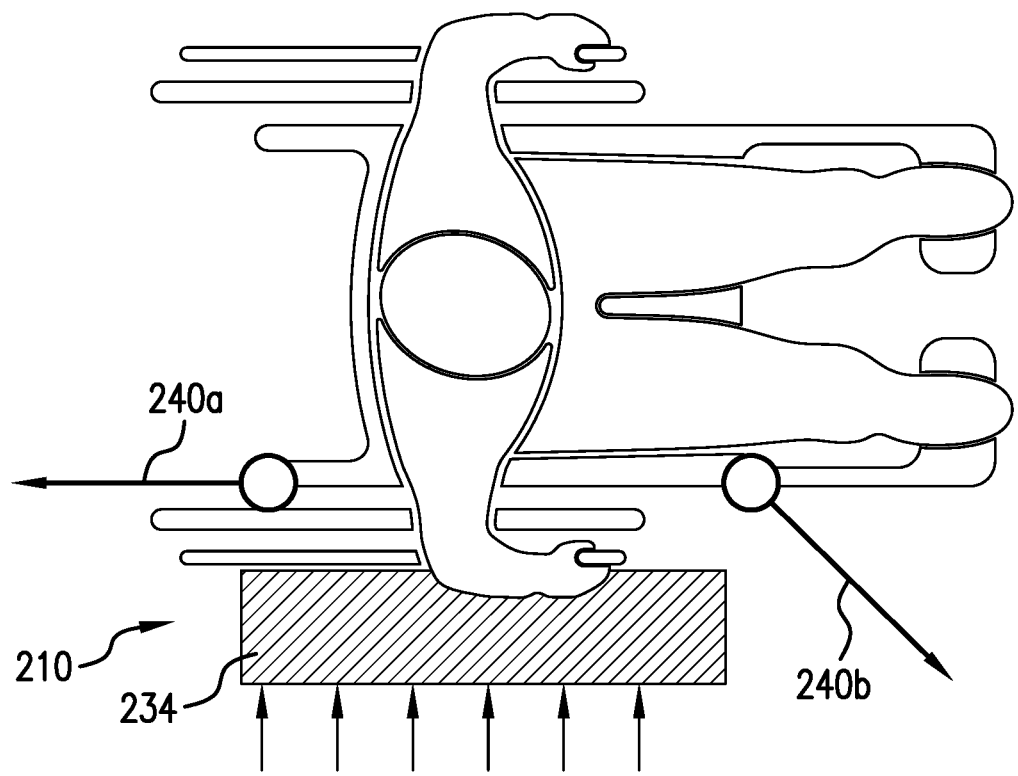
FIG. 5 is a top view illustrating a second embodiment of a two-point wheelchair securement system.

Turning now to FIG. 5, a second embodiment of a wheelchair securement station 210 is depicted. The station 210 presents a much more simple configuration than presented by the previously described embodiments and includes two securement assemblies 240a, 240b positioned in the rear-wall side quadrant and the front wall-side quadrant of the wheelchair securement area, respectively. Like the earlier embodiment, the securement assemblies 240a, 240b can include retractors. While the earlier embodiment shows the retractors attached to various barrier and side-wall modules, the retractors 240a, 240b of the second embodiment can be mounted to any structure in the vehicle; for example, the retractors could be floor or wall mounted. In such configuration, the retractors 240a, 240b can be directly attached to the wall or floor, or could be attached to the wall or floor using track structures or pocket anchorages. For example, in one installation, Q'Straint's "L" track structure or Slide N' Click pocket anchorages could be used. A bracket of some type could be used to ensure the angle and position of the retractor is optimal. As with the earlier embodiment, the retractors 240a, 240b cooperate with a bumper, barrier, or pad 234 to adequately secure the wheelchair in compliance with the ADA and to prevent significant movement, twisting, or tipping of the wheelchair. As with the previous embodiment, the bumper can be stationary or moveable, remote releases can be used one or both of the retractors to maintain them in an unlocked condition for a predetermined period of time, and tensioning mechanisms can be used with one or both of the retractors.

Figure 6:
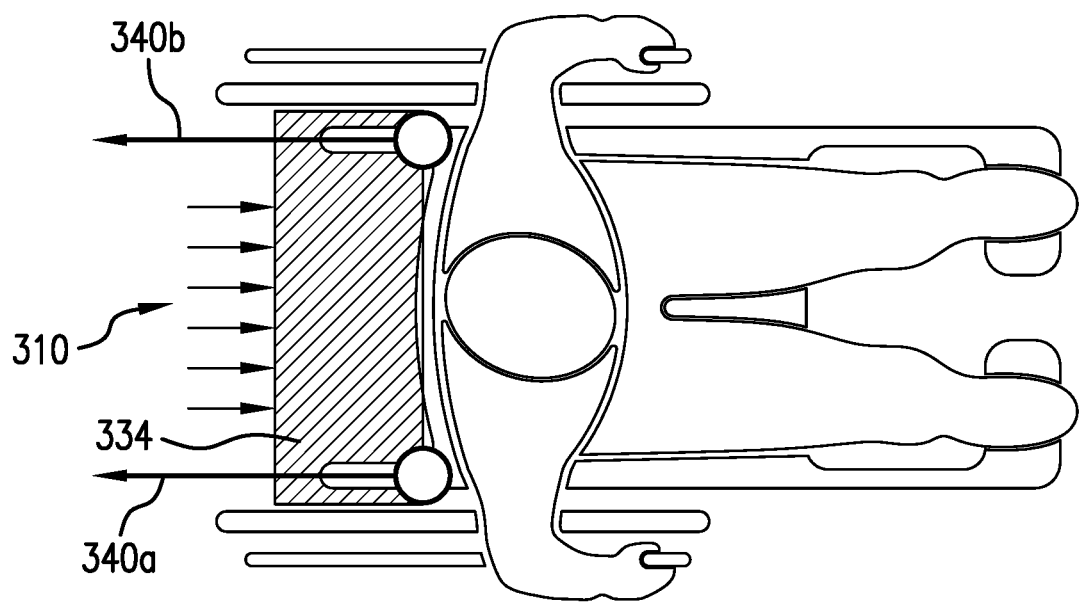
FIG. 6 is a top view illustrating a third embodiment of a two-point wheelchair securement system.

Turning now to FIG. 6, a third embodiment of a wheelchair securement station 310 is depicted. As with the second embodiment, the station 310 presents a much more simple configuration than presented by the first embodiments and includes two securement assemblies 340a, 340b positioned in the rear-wall side quadrant and the rear aisle-side quadrant of the wheelchair securement area, respectively. Like the earlier embodiment, the securement assemblies 340a, 340b can include retractors. While the first embodiments shows one retractor attached to a barrier module and a second retractor attached to a side-wall module, the retractors 340a, 340b of the third embodiment can both be mounted to the barrier module or to any other structure in the vehicle; for example, the retractors could be floor or wall mounted. In such configuration, the retractors 340a, 340b can be directly attached to the wall or floor, or could be attached to the wall or floor using track structures or pocket anchorages. For example, in one installation, Q'Straint's "L" track structure or Slide N' Click pocket anchorages could be used. A bracket of some type could be used to ensure the angle and position of the retractor is optimal. Alternatively, both retractors could be attached to an extendable or retractable arm structure, like the one disclosed in U.S. patent application Ser. No. 11/776,223, which is incorporated in its entirely herein by reference. Alternatively, the device disclosed in U.S. Pat. No. 7,717,655, which is incorporated in its entirety herein by reference, could be used to provide the two rear restraints. As with the earlier embodiment, the retractors 340a, 340b cooperate with a bumper, barrier, or pad 334 to adequately secure the wheelchair in compliance with the ADA and to prevent significant movement, twisting, or tipping of the wheelchair. As with the previous embodiment, the bumper can be stationary or moveable. For example, the moveable backrest disclosed in U.S. Patent Application Ser. No. 61/799,756, which is incorporated in its entirety herein by reference, can be used as the bumper 334. In addition, remote releases can be used one or both of the retractors to maintain them in an unlocked condition for a predetermined period of time and tensioning mechanisms can be used with one or both of the retractors.

Although the inventions described and claimed herein have been described in considerable detail with reference to certain embodiments, one skilled in the art will appreciate that the inventions described and claimed herein can be practiced by other than those embodiments, which have been presented for purposes of illustration and not of limitation. Therefore, the spirit and scope of the appended claims should not be limited to the description of the embodiments contained herein. It should be understood that the arrangements described herein are for purposes of example only. As such, those skilled in the art will appreciate that other arrangements and other elements can be used instead, and some elements may be omitted altogether. Further, many of the elements may be implemented as discrete or distributed components or in conjunction with other components, in any suitable combination.

We claim:

1. A securement system adapted for securing a mobility device in a vehicle during transport, the securement system comprising:
   a bumper and two and only two flexible restraints adapted for securing the mobility device, the two flexible restraints comprising a first restraint and a second restraint, the first restraint having a first hook at a first terminal end for attachment to the mobility device, and the second restraint having a second hook at a second terminal end for attachment to the mobility device;
   the bumper being moveable from a first position to a second position, wherein the bumper in the second position is adapted to contact the mobility device and induce pre-tension into at least one of the first restraint and the second restraint.

2. The securement system of claim 1 further comprising the vehicle, wherein the vehicle has a mobility device securement area with a first half and a second half, the securement system being disposed in the mobility device securement area, wherein the first restraint has a first vehicle attachment point located in the first half and the second restraint has a second vehicle attachment point located in the first half.

3. The securement system of claim 2, wherein the bumper is located in the first half.

4. The securement system of claim 2 further comprising the mobility device, wherein the mobility device is disposed in the mobility device securement area with a rear of the mobility device being disposed in the first half of the mobility device securement area.

5. The securement system of claim 3 further comprising the mobility device, wherein the mobility device is disposed in the mobility device securement area with a rear of the mobility device being disposed in the first half of the mobility device securement area.

6. The securement system of claim 2, wherein the first restraint has a first mobility device attachment point located in the first half and the second restraint has a second mobility device attachment point located in the first half.

7. The securement system of claim 3, wherein the first restraint has a first mobility device attachment point located in the first half and the second restraint has a second mobility device attachment point located in the first half.

8. The securement system of claim 4, wherein the first restraint has a first mobility device attachment point located in the first half and the second restraint has a second mobility device attachment point located in the first half.

9. The securement system of claim 1 further comprising the vehicle and the mobility device, wherein:
   the vehicle has a mobility device securement area;
   the first restraint extends from a first vehicle attachment point to a first mobility device attachment point along a first axis;
   the second restraint extends from a second vehicle attachment point to a second mobility device attachment point along a second axis;
   each of the first axis and the second axis coincide with a tensile force exerted by each of the first restraint and the second restraint;
   in the second position, the bumper exerts a compressive force upon the mobility device; and,
   at least a portion of the bumper abuts the mobility device at a location positioned outside of the region formed between the first axis and the second axis.

10. The securement system of claim 4, wherein:
    the first restraint extends from the first vehicle attachment point to a first mobility device attachment point along a first axis;
    the second restraint extends from the second vehicle attachment point to a second mobility device attachment point along a second axis;
    each of the first axis and the second axis coincide with a tensile force exerted by each of the first restraint and the second restraint;
    in the second position, the bumper exerts a compressive force upon the mobility device; and,
    at least a portion of the bumper abuts the mobility device at a location positioned outside of the region formed between the first axis and the second axis.

11. The securement system of claim 1 further comprising the vehicle, wherein the vehicle has a mobility device securement area with a first half and a second half, the securement system being disposed in the mobility device securement area, wherein the first restraint has a first vehicle attachment point located in the first half and the second restraint has a second vehicle attachment point located in the second half.

12. The securement system of claim 11, wherein at least a portion of the bumper is located in the first half.

13. The securement system of claim 11 further comprising the mobility device, wherein the mobility device is disposed in the mobility device securement area with a rear of the mobility device being disposed in the first half of the mobility device securement area.

14. The securement system of claim 12 further comprising the mobility device, wherein the mobility device is disposed in the mobility device securement area with a rear of the mobility device being disposed in the first half of the mobility device securement area.

15. The securement system of claim 11, wherein the first restraint has a first mobility device attachment point located in the first half and the second restraint has a second mobility device attachment point located in the second half.

16. The securement system of claim 12, wherein the first restraint has a first mobility device attachment point located in the first half and the second restraint has a second mobility device attachment point located in the first half.

17. The securement system of claim 13, wherein the first restraint has a first mobility device attachment point located in the first half and the second restraint has a second mobility device attachment point located in the first half.

18. The securement system of claim 14, wherein the first restraint has a first mobility device attachment point located in the first half and the second restraint has a second mobility device attachment point located in the first half.

19. The securement system of claim 13, wherein:
the first restraint extends from the first vehicle attachment point to a first mobility device attachment point along a first axis;
the second restraint extends from the second vehicle attachment point to a second mobility device attachment point along a second axis;
each of the first axis and the second axis coincide with a tensile force exerted by each of the first restraint and the second restraint;
in the second position, the bumper exerts a compressive force upon the mobility device; and,
at least a portion of the bumper abuts the mobility device at a location positioned outside of the region formed between the first axis and the second axis.

* * * * *